(12) United States Patent
Schneider

(10) Patent No.: US 7,925,009 B2
(45) Date of Patent: Apr. 12, 2011

(54) HYBRID DATA ENCRYPTION

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 991 days.

(21) Appl. No.: 11/807,261

(22) Filed: May 25, 2007

(65) Prior Publication Data

US 2008/0292096 A1 Nov. 27, 2008

(51) Int. Cl.
*H04K 1/00* (2006.01)
(52) U.S. Cl. .......................... 380/28; 380/37
(58) Field of Classification Search .............. 380/28, 380/29, 30, 37, 42
See application file for complete search history.

(56) References Cited

U.S. PATENT DOCUMENTS

| | | | | |
|---|---|---|---|---|
| 5,214,703 A * | 5/1993 | Massey et al. | .............. | 380/37 |
| 5,799,088 A * | 8/1998 | Raike | .............. | 380/30 |
| 6,061,449 A * | 5/2000 | Candelore et al. | .............. | 380/28 |
| 6,560,338 B1 * | 5/2003 | Rose et al. | .............. | 380/47 |
| 6,999,588 B1 * | 2/2006 | Oishi | .............. | 380/246 |
| 7,103,181 B2 * | 9/2006 | Ananth | .............. | 380/37 |
| 7,795,899 B1 * | 9/2010 | Grohoski et al. | .............. | 326/8 |
| 2001/0029608 A1 * | 10/2001 | Nagashima et al. | .............. | 725/2 |
| 2001/0033656 A1 * | 10/2001 | Gligor et al. | .............. | 380/28 |
| 2002/0136406 A1 * | 9/2002 | Fitzhardinge et al. | .............. | 380/210 |
| 2005/0177727 A1 * | 8/2005 | Moskowitz et al. | .............. | 713/176 |
| 2006/0126843 A1 * | 6/2006 | Brickell et al. | .............. | 380/260 |
| 2007/0076890 A1 * | 4/2007 | Muresan et al. | .............. | 380/287 |
| 2007/0237327 A1 * | 10/2007 | Taylor et al. | .............. | 380/37 |
| 2008/0130876 A1 * | 6/2008 | Etienne et al. | .............. | 380/29 |
| 2009/0214024 A1 * | 8/2009 | Schneider | .............. | 380/28 |
| 2009/0220083 A1 * | 9/2009 | Schneider | .............. | 380/268 |

OTHER PUBLICATIONS

Friedrich L. Bauer, 8.Transposition Ciphers, 2000, decypted secrets, $2^{nd}$ ed.*
Transposition cipher, Wikipedia, the free encyclopedia, http://en.wikipedia.org/wiki/Transposition_cipher; accessed May 8, 2007, 8 pages.
Fauzan Mirza, "Block Ciphers and Cryptanalysis", Mar. 1998, pp. 1-27.
Shannon, C. E, "Communication Theory of Secrecy Systems", *Bell System Technical Journal*, vol. 28 (4), 1949, pp. 656-715.
"Data Encryption Standard (DES)", *Federal Information Processing Standards Publication 46-2*, http://www.itl.nist.gov/fipspubs/fip46-2.htm, Dec. 30, 1993, 16 pages.
"Data Encryption Standard (DES)", *U.S. Department of Commerce/National Institute of Standards and Technology*, FIPS PUB 46-3, Reaffirmed Oct. 25, 1999, 26 pages.
Red Hat Office Action for U.S. Appl. No. 12/072,069 (P309) mailed Sep. 2, 2010.
Red Hat Office Action for U.S. Appl. No. 12/074,012 (P310) mailed Sep. 3, 2010.

(Continued)

*Primary Examiner* — Matthew B Smithers
*Assistant Examiner* — Abu Sholeman
(74) *Attorney, Agent, or Firm* — Blakely, Sokoloff, Taylor & Zafman LLP

(57) ABSTRACT

A method and apparatus for encrypting and decrypting data. A first block cipher encrypts data to generate a first cipher output. A first double irregular columnar transposition cipher encrypts the first cipher output to generate a second cipher output. A second block cipher encrypts the second cipher output to generate a third cipher output.

20 Claims, 7 Drawing Sheets

OTHER PUBLICATIONS

Barker, William C., "Recommendation for the Triple Data Encryption Algorithm (TDEA) Block Cipher", *National Institute of Standards and Technology, Technology Administration U.S. Department of Commerce, Information Security, NIST Special Publication 800-67*, Version 1.1, Revised May 19, 2008, (May 2004), 40 pages.

Fischer, Viktor, "Realization of the Round 2 AES Candidates Using Altera FPGA", (2000), pp. 1-15.

Rose, Greg, "A Stream Cipher Based on Linear Feedback over GF(2^8)", Springer-Verlag Berlin Heidelberg, C. Boyd and E. Dawson: *ACISP '98, LNCSI1438*, (1998), pp. 135-145.

Schneier, "Applied Cryptography", John Wiley and Sons, 2nd Edition, (1996), p. 319.

Tan, Chih Jeng K., "The PLFG parallel pseudorandom number generator", *Future Generation computer Systems* vol. 18, Issue 5, Feb. 2002, pp. 693-698.

\* cited by examiner

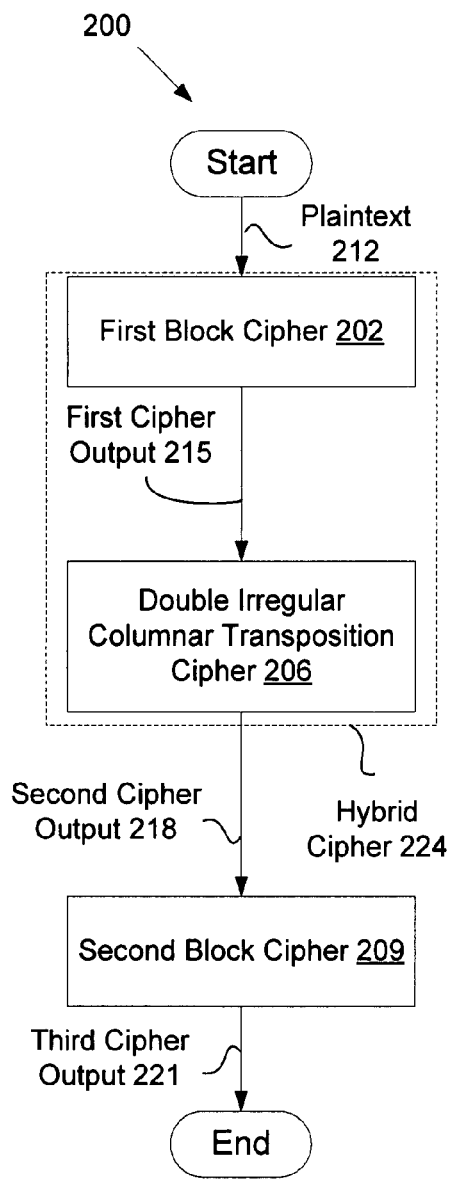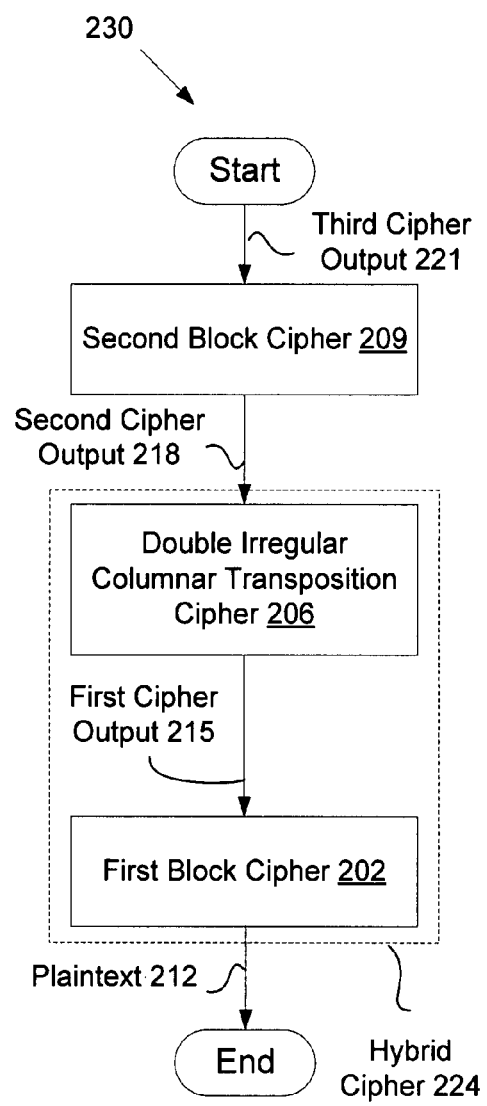
Figure 2A
Figure 2B

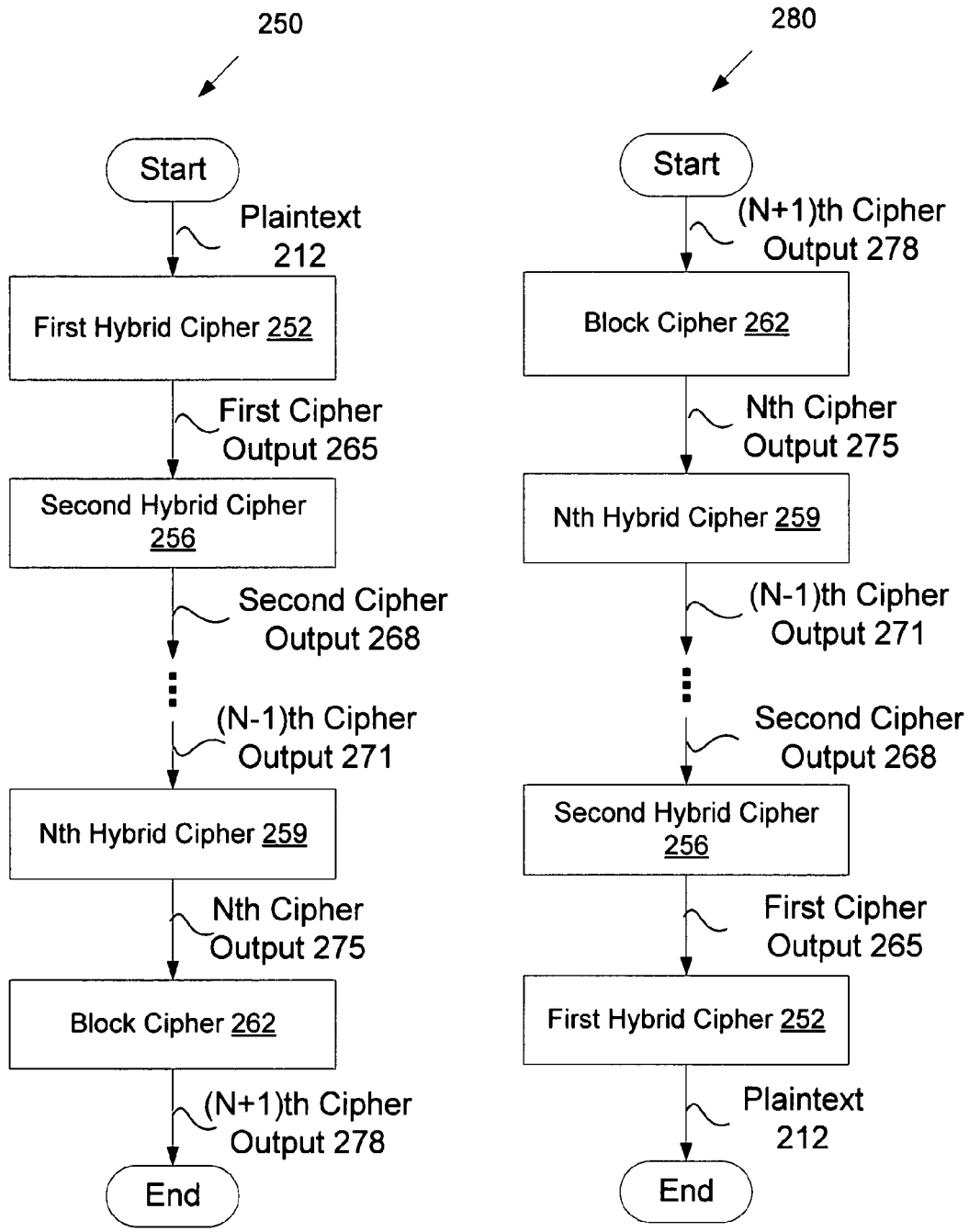

HYBRID DATA ENCRYPTION

TECHNICAL FIELD

Embodiments of the present invention relate to data encryption, and more specifically to data encryption that combines block ciphers and double irregular columnar transposition ciphers.

BACKGROUND

Encryption is a process of transforming information (referred to as plaintext) into an unreadable form (referred to as ciphertext). Decryption is a transformation that recovers the plaintext from the ciphertext. A cipher performs a transformation that is controlled using a symmetric key (same key used for ciphering and deciphering) or an asymmetric key (different keys used for ciphering and deciphering) such that when the key is input to the cipher along with plaintext, the plaintext is enciphered via an encryption transformation, and when the key is input to the cipher along with ciphertext, the ciphertext is deciphered via a decryption transformation (which is an inverse of the encryption transformation). Encryption transformations are performed by an encryption algorithm (function) of a cipher, and decryption transformations are performed by a decryption algorithm (function) of the cipher.

Encryption is used to protect military and civilian systems, examples of which include internet e-commerce, mobile telephone networks, bank automatic teller machines, etc. As technology and computing power advance, new vulnerabilities are commonly discovered for encryption mechanisms that were previously considered secure. When such weaknesses are discovered, new encryption mechanisms and techniques are required to maintain security of sensitive information.

BRIEF DESCRIPTION OF THE DRAWINGS

The present invention is illustrated by way of example, and not by way of limitation, in the figures of the accompanying drawings and in which:

FIG. 2A illustrates a data flow corresponding to one embodiment of a data encryption process;

FIG. 2B illustrates a data flow corresponding to one embodiment of a data decryption process;

FIG. 2C illustrates a data flow corresponding to another embodiment of a data encryption process;

FIG. 2D illustrates a data flow corresponding to another embodiment of a data decryption process;

DETAILED DESCRIPTION

Figure 1A:
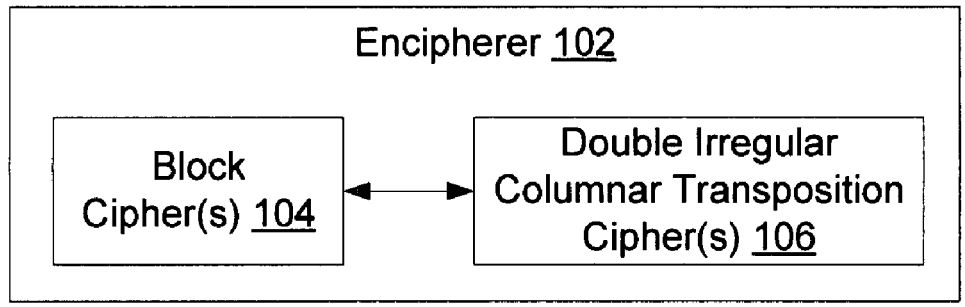
FIG. 1A illustrates an encipherer, in accordance with one embodiment of the present invention.

Described herein is a method and apparatus for encrypting and decrypting data. In one embodiment, a first block cipher encrypts data to generate a first cipher output. A double irregular columnar transposition cipher encrypts the first cipher output to generate a second cipher output. A second block cipher encrypts the second cipher output to generate a third cipher output. The second block cipher may match the first block cipher, and may use a function for encryption that is an inverse to a function that first block cipher uses to encrypt data. In one embodiment, the third cipher output has an alphabet that matches an alphabet of the data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1A illustrates an encipherer 102, in accordance with one embodiment of the present invention. The encipherer 102 enciphers (encrypts) and deciphers (decrypts) data. In one embodiment, the encipherer 102 includes one or more block ciphers 104 and one or more double irregular columnar transposition ciphers 106.

Block ciphers 104 are substitution ciphers that operate on fixed-length groups of bits known as blocks. Where data to be encrypted is longer than a block, the data is divided into multiple blocks, and each block is separately encrypted. In one embodiment, block ciphers have an encryption and a decryption algorithm, each of which accepts an input block of size n bits as a first input and a key of size k bits as a second input, and produce an n-bit output block. For example, a block cipher might take as an input a 128-bit block of plaintext (unciphered data) and an 80 bit key, and output a corresponding 128-bit block of ciphertext (ciphered data). Likewise, the block cipher may take as an input a 128-bit block of ciphertext and the 80 bit key, and output a 128-bit block of plaintext. In another embodiment, the encryption algorithm may accept an input block of size m bits, and output a block of size n bits, and the decryption algorithm may accept an input block of size n bits, and output a block of size m bits. Common block sizes for a block cipher to operate on include 64 bit (8 byte) and 128 bit (16 byte), and common key sizes include 40 bits, 56 bits, 64 bits, 80 bits, 128 bits, 160 bits, 168 bits, 192 bits and 256 bits. Other sized blocks and keys may also be used.

Ciphertext output by block ciphers 104 may include the same set of symbols as the input plaintext, or a different set of symbols. Moreover, an output alphabet (set of output symbols) of a block cipher may have a number of symbols that is the same as or different from the number of symbols in an input alphabet (set of input symbols). Examples of block ciphers include twofish, blowfish, serpent, data encryption standard (DES), advanced encryption standard (AES), CAST5, international data encryption algorithm (IDEA), etc.

For a block cipher to be made secure, it may be used in a mode of operation, which may encrypt different blocks in different ways. Thereby, even if two different blocks include the same plaintext, the corresponding ciphertext will be different for the two blocks. Examples of modes of operation include electronic codebook (EBC), cipher-block chaining (CBC), propagation cipher-block chaining (PCBC), cipher feedback (CFB), output feedback (OFB), etc.

A transposition cipher rearranges the order of plaintext characters to generate ciphertext. A transposition cipher may operate on all available data to be encrypted, or it may divide the data into groups, and operate on each group separately. In a columnar transposition cipher, plaintext is written out in rows of fixed length, and read out column by column, the columns being chosen in a scrambled order. The length of the rows, and the permutation of the columns is determined by the key.

In a columnar transposition cipher, not all rows may have the same fixed length if the number of characters is not evenly divisible by the row length (number of characters per row). For example, if a plaintext has thirteen characters, and the key indicates four rows, then there are not enough characters in the plaintext to fill four rows with four characters each. In a regular columnar transposition cipher, additional characters are added to the plaintext until all the rows are filled. In an irregular columnar transposition cipher, on the other hand, no additional characters are added to the plaintext. Continuing the previous example, in the irregular case the first three rows may have the predetermined fixed length of four characters, while the final row may have only a single character and three unfilled spaces.

Double irregular columnar transposition ciphers 106 are a form of irregular columnar transposition cipher in which an irregular columnar transposition is performed twice. The same key can be used for both transformations (causing the same transformation to be repeated), or different keys may be used for each transformation (causing different transformations).

Data encrypted or decrypted by encipherer 102 is processed by at least one block cipher 104 and at least one double irregular columnar transposition cipher 106. The block ciphers 104 may operate on plain text, and on outputs of the double irregular columnar transposition ciphers 106, and the double irregular columnar transposition ciphers 104 may operate on outputs of the block ciphers 104.

As described above, a block cipher generally operates on symbols in one block at a time, such that a block of ciphertext output by the block cipher is dependent only on symbols in a single input block. For example, if 512 bytes of data are to be encrypted by a block cipher that processes 8 byte blocks, sixty four independent 8 byte output blocks may be produced.

By applying the double irregular columnar transposition cipher to output blocks encrypted by the block cipher, data within the output blocks may be scrambled between blocks, thereby extending the cryptosystem. For example, a double irregular columnar transposition cipher may operate on sixty four 8 byte blocks that have been encrypted by a block cipher. The sixty four 8 byte blocks represent 512 bytes of data that may be input into the double irregular columnar transposition cipher and enciphered as a single 512 byte unit. Thus, information in each of the 8 byte blocks may be scrambled throughout the 512 bytes. Therefore, each byte of input may affect more than just 8 bytes of output (as would be the case if using only the example block cipher). In the example, an 8 byte cryptosystem is effectively extended to a 512 byte cryptosystem.

Figure 1B:
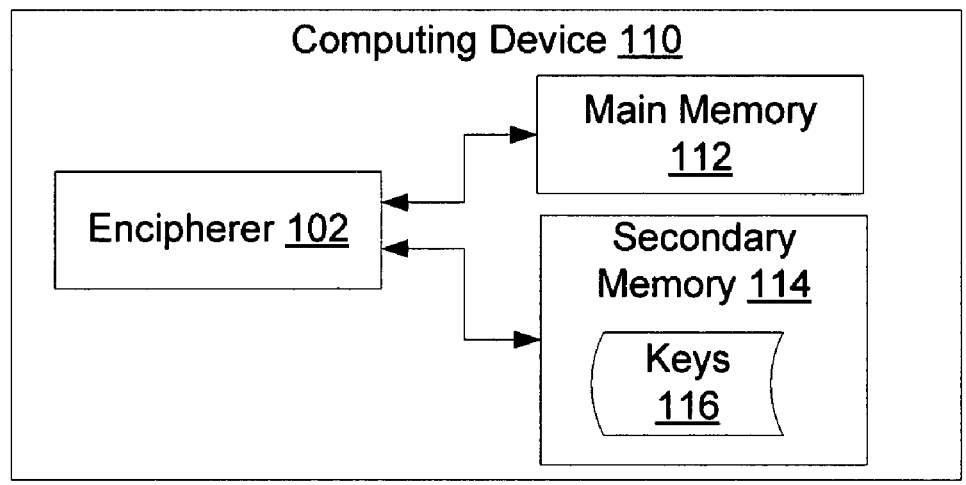
FIG. 1B illustrates an exemplary computing device, in accordance with one embodiment of the present invention.

FIG. 1B illustrates an exemplary computing device 110, in accordance with one embodiment of the present invention. The computing device 110 includes encipherer 102 connected with a main memory 112 and a secondary memory 114. The main memory 112 may include volatile memory (e.g., read-only memory (ROM), flash memory, dynamic random access memory (DRAM) such as synchronous DRAM (SDRAM) or Rambus DRAM (RDRAM), etc.) or static memory (e.g., flash memory, static random access memory (SRAM), etc.). The secondary memory 114 may include one or more persistent data storage devices that may include, for example static memory, hard drives, optical drives, tape backup systems, etc. The secondary memory 114 may be local to the computing device 110 (as illustrated), or external to the computing device 110.

In one embodiment, keys 116 are stored in secondary memory 114. In another embodiment, keys 116 are stored in main memory 112. Keys 116 may be stored, for example, in a protected region of main memory 112 or secondary memory 114 (memory accessible only to certain processes). In yet another embodiment, keys 116 are stored externally to computing device 110. Such externally stored keys 116 may be stored, for example, in a USB dongle, firewire dongle, or other external storage device. In embodiments that implement external keys, encrypted regions of the main memory 112 and secondary memory 114 may not be decrypted unless the external storage device having keys 116 is connected with computing device 110.

Keys 116 include at least a first key that dictates variables to use when enciphering main memory 112 and secondary memory 114 using a block cipher, and a second key that dictates variables to use when enciphering main memory 112 and secondary memory 114 using a double irregular columnar transposition cipher. Multiple keys may be used for both a block cipher portion and a double irregular columnar transposition portion of an encryption procedure (e.g., where multiple iterations of encrypting occur). Moreover, different keys may be used for encrypting different regions of main memory 112 and secondary memory 114. In one embodiment, keys 116 are encrypted such that a password must be given to enable access to them. Alternatively, the keys may not be encrypted.

In one embodiment, encipherer 102 is a hardware component of computing device 110. Alternatively, encipherer 102 may include software that is part of an operating system, an application, or a combination thereof. Encipherer 102 may also be a combination of software and hardware.

Encipherer 102 can encipher data in the main memory 112 and the secondary memory 114 to secure such data. When enciphering data, new keys may be generated and stored, or existing keys may be provided. In one embodiment, the encipherer 102 is configured to encrypt all of secondary memory 114 and main memory 112. In another embodiment, only some of the main memory 112 and/or secondary memory 114 are encrypted (e.g., using filesystem-level encryption). In both instances, encrypted data may not be read or used until encipherer 102 deciphers the enciphered data using the same keys 116 used to encrypt the data.

Figure 1C:
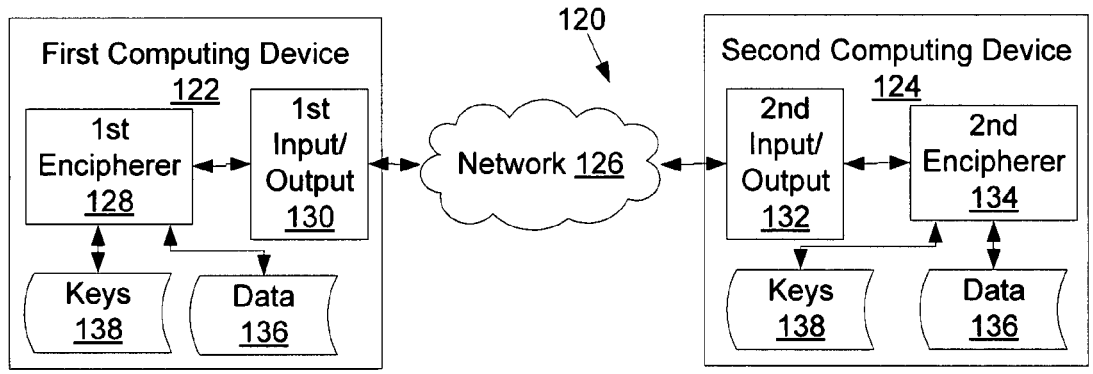
FIG. 1C illustrates an exemplary network architecture, in which embodiments of the present invention may operate.

FIG. 1C illustrates an exemplary network architecture 120, in which embodiments of the present invention may operate. The network architecture 120 may include a first computing device 122 connected to a second computing device 124 via a network 126, which may be a public network (e.g., Internet) or a private network (e.g., Ethernet or a local area Network (LAN)).

First computing device 122 and second computing device 124 may be personal computers (PCs), servers, personal data assistants (PDAs), cellular phones, etc. First computing device 122 and/or second computing device 124 may be connected with one or more additional computing devices (not shown), and may provide data encryption services to the additional computing devices. Thereby, it may not be necessary for the additional computing devices to include an encipherer.

Each of the first computing device 122 and the second computing device 124 include an input/output 130 and 132, an encipherer 128 and 134, data 136 and keys 138. In one embodiment, the first encipherer 128 and second encipherer 134 are each examples of encipherer 102 of FIG. 1A. First encipherer 128 enciphers data 136 using keys 138, which may be internal or external to first computing device 122. First encipherer 128 forwards the encrypted data 136 to the first input/output 130, which sends the encrypted data over the network 126 to the second input/output 132 of the second computing device 124. Data may be sent between first input/output 130 and second input/output 132 using a network application. Examples of network applications include those that communicate using file transfer protocol (ftp), telnet, email, instant messaging, hyper text transfer protocol (HTTP), etc. The second input/output 132 passes on the data to the second encipherer 134, which decrypts the data 136 using keys 138. To successfully decrypt data 136, second encipherer 134 must have access to the same keys 138 that were used to encrypt data 136.

Figure 1D:
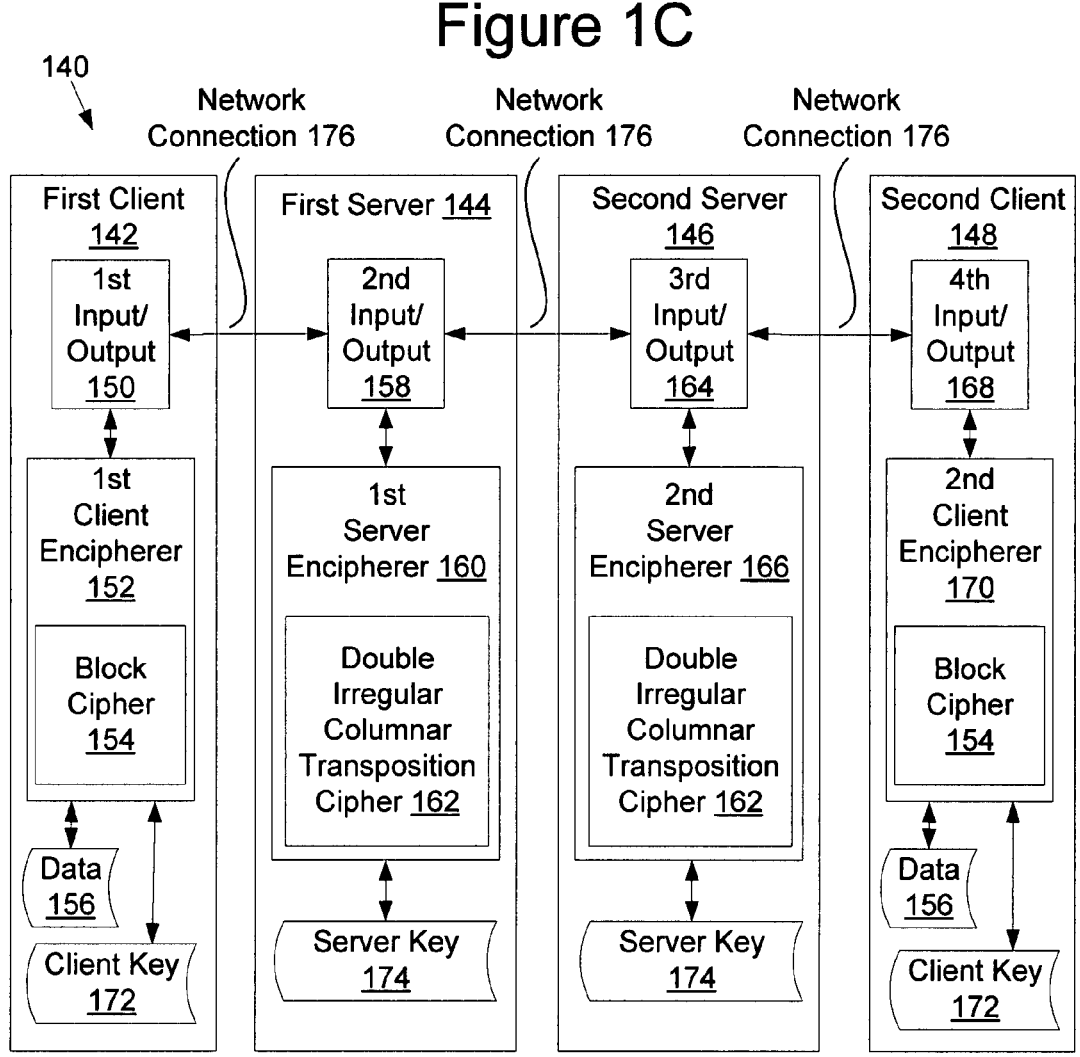
FIG. 1D illustrates another exemplary network architecture, in which embodiments of the present invention may operate.

FIG. 1D illustrates another exemplary network architecture 140, in which embodiments of the present invention may operate. The network architecture 140 may include a first client 142, a first server 144, a second server 146 and a second client 148. The first client 142, first server 144, second server 146 and second client 148 may be connected via a network connection 176, which may be a connection via a public network (e.g., Internet) or a private network (e.g., Ethernet or a local area Network (LAN)).

First client 142 and second client 148 may each include an input/output 150 and 168, a client encipherer 152 and 170, data 156 and a client key 172. First client encipherer 152 of first client 142 and second client encipherer 170 of second client 148 may each include a block cipher 154.

First server 144 and second server 146 may each include an input/output 144 and 146, a server encipherer 160 and 166 and a server key 174. First server encipherer 160 and second server encipherer 166 may each include a double irregular columnar transposition cipher 162.

The first client encipherer 152 may be configured to encrypt data 156 using first block cipher 154 and client key 172 to generate a first cipher output. First input/output 150 may transmit the first cipher output to second input/output 158 of first server 144.

First server encipherer 160 may be configured to receive the first cipher output from second input/output 158, and to encrypt the first cipher output using double irregular columnar transposition cipher 162 and server key 174 to generate a second cipher output. Second input/output 158 may transmit the second cipher output to third input/output 164 of second server 146. Third input/output 164 may forward the second cipher output to second server encipherer 166, which may be configured to use double irregular columnar transposition cipher 162 and server key 174 to decrypt the second cipher output and obtain first cipher output.

The first cipher output can be transmitted by third input/output 164 to fourth input/output 168 of second client 148. Fourth input/output 168 may then forward the first cipher output to second client encipherer 170, which may be configured to use block cipher 154 and client key 172 to decrypt first cipher output, and thus reproduce data 156.

Neither the first server 144 nor the second server 146 need to know client key 172, nor do first client 142 or second client 148 need to be aware of server key 174. Thereby, additional encryption may be provided and removed at intermediate points between clients to provide additional security without modifying the clients. This may be beneficial, for example, where first client 142 is connected to first server 144 over a secure channel (e.g., via a private network), and second client 148 is connected to second server 146 via a secure channel, but where first server 144 and second server 146 are connected via an unsecure channel. Therefore, weak encryption may be sufficient for messages passed between first client 142 and first server 144 or second client 148 and second server 146, but it may be necessary to add additional encryption by first server 144 before transmitting the message to second server 146. The additional encryption may then be removed by second server 146 before passing on the message to second client 148.

Figure 1E:
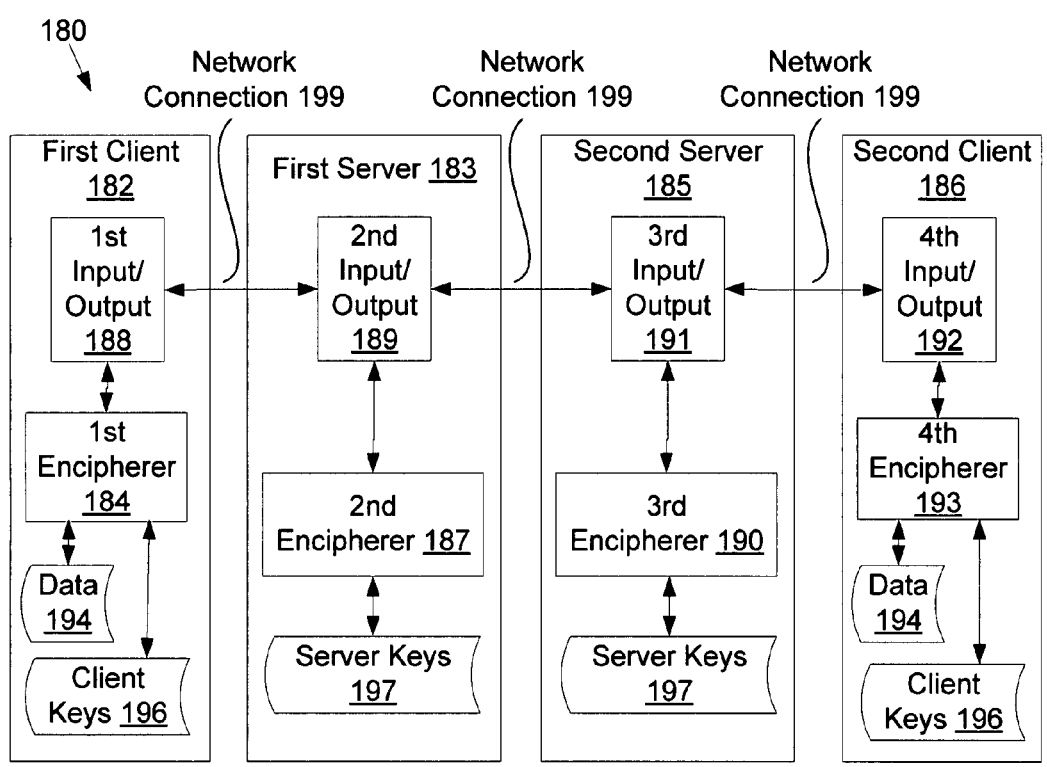
FIG. 1E illustrates yet another exemplary network architecture, in which embodiments of the present invention may operate.

FIG. 1E illustrates yet another exemplary network architecture 180, in which embodiments of the present invention may operate. The network architecture 180 may include a first client 182, a first server 183, a second server 185 and a second client 186. The first client 182, first server 183, second server 185 and second client 186 may be connected via a network connection 199, which may be a connection via a public network (e.g., Internet) or a private network (e.g., Ethernet or a local area Network (LAN)).

First client 182 and second client 186 may each include an input/output 188 and 192, an encipherer 184 and 193, data 194 and client keys 196. First server 183 and second server 185 may each include an input/output 189 and 191, an encipherer 187 and 190 and server keys 197.

In one embodiment, first encipherer 184, second encipherer 187, third encipherer 190 and fourth encipherer 193 each correspond to encipherer 102 of FIG. 1A. Therefore, each encipherer includes at least one block cipher and at least one double irregular columnar transposition cipher, and is configured to encrypt data using first the block cipher, and then the double irregular columnar transposition cipher, and to decrypt data using first the double irregular columnar transposition cipher, and then the block cipher.

First encipherer 184 of first client 182 may be configured to encrypt data 194 using client keys 196 to generate a client cipher output. First input/output 188 may transmit the client cipher output to second input/output 189 of first server 183. Second encipherer 187 of first server 183 may be configured to receive the client cipher output from second input/output 189, and to encrypt the client cipher output using server keys 197 to generate a server cipher output. Second input/output 189 may transmit the server cipher output to third input/output 191 of second server 185. Third input/output 191 may forward the server cipher output to third encipherer 190 of second server 185, which may be configured to decrypt the server cipher output using server keys 197 to obtain client cipher output. Client cipher output can be transmitted by third input/output 191 to fourth input/output 192 of second client 186. Fourth input/output 192 may then forward the client cipher output to fourth encipherer 193 of second client 186, which may be configured to use client keys 196 to decrypt client cipher output, and thus reproduce data 194.

FIG. 2A illustrates a data flow 200 corresponding to one embodiment of a data encryption process 200. In one embodiment, the data is processed by encipherer 102 of FIG. 1A.

Referring to FIG. 2A, data in the form of plaintext 212 is input into first block cipher 202. First block cipher 202 uses an encryption function to encrypt plaintext 212 based on a first key to generate first cipher output 215. First cipher output 215 is input into double irregular columnar transposition cipher 206. Double irregular columnar transposition cipher 206 uses an encryption function to encrypt the first cipher output 206 based on a second key to generate second cipher output 218.

First block cipher 202 and double irregular columnar transposition cipher 206 together form a hybrid cipher 224. Plaintext 212 is input into hybrid cipher 224 for encryption to produce second cipher output 218. Such encryption by hybrid cipher includes processing data by first block cipher 202 and then by double irregular columnar transposition cipher 206.

Second cipher output 218 may be input into second block cipher 209. In one embodiment, second block cipher 209 is the same as first block cipher 202, and encrypts the second cipher output 218 using an encryption function that is an inverse of the encryption function used by first block cipher 202 to generate first cipher output 215. Such an encryption function, when used with the first key, may generate a third cipher output 221 having an alphabet that is the same as an alphabet of plaintext 212. In another embodiment, second block cipher 209 may be the same as first block cipher 202, but may encrypt the second cipher output 218 using a third key to generate third cipher output 221. In yet another embodiment, second block cipher 209 may be different from first block cipher (e.g., a different type of block cipher), and may encrypt the second cipher output 218 using a third key to generate third cipher output 221.

FIG. 2B illustrates a data flow 230 corresponding to one embodiment of a data decryption process. The data decryption process is an inverse of the data encryption process illustrated in FIG. 2A. In one embodiment, the data is processed by encipherer 102 of FIG. 1A.

Data in the form of third cipher output 221 is input into second block cipher 209. Second block cipher 209 uses a decryption function to decrypt the third cipher output 221, the decryption function being an inverse of the encryption function used to generate third cipher output 221. The key that was employed to generate third cipher output (e.g., first key or third key) is employed to perform the decryption. Thereby, second block cipher 209 may recreate second cipher output 218.

Second cipher output 218 may be input into double irregular columnar transposition cipher 206 for decryption. Double irregular columnar transposition cipher 206 may use a decryption function to decrypt the second cipher output 218, the decryption function being an inverse of the encryption function used to generate second cipher output 218. The key that was employed to generate second cipher output 218 is employed to perform the decryption. Thereby, double irregular columnar transposition cipher 206 may recreate first cipher output 215.

First cipher output 215 is input into first block cipher 202, which may use a decryption function to decrypt first cipher output 215, the decryption function being an inverse of the encryption function used to generate first cipher output 215. The key that was employed to generate first cipher output 215 is employed to perform the decryption. Thereby, first block cipher 202 may reproduce plaintext 212.

Double irregular columnar transposition cipher 206 and first block cipher 202 together form a hybrid cipher 224. To decrypt data using hybrid cipher 224, the encrypted data is first decrypted by the double irregular columnar transposition cipher 206, and then by the first block cipher 202, to reverse encryption. Thereby, second cipher output 218 that is input into hybrid cipher 224 is output as plaintext 212.

FIG. 2C illustrates a data flow 250 corresponding to another embodiment of a data encryption process. The data encryption process shows data input to, and output from, multiple hybrid ciphers (e.g., first hybrid cipher 252, second hybrid cipher 256, etc.) in a cascading manner (such that each hybrid cipher takes as an input a cipher output generated by the previous hybrid cipher). Each of the hybrid ciphers may correspond to hybrid cipher 224 of FIG. 2A. Moreover, each of the hybrid ciphers may be the same, and use the same keys or different keys, or may be different and use different keys.

For an example of different hybrid ciphers, first hybrid cipher 252 may include a first type of block cipher (e.g., DES), and second hybrid cipher 256 may include a second type of block cipher (e.g., IDEA). In one embodiment, each of the hybrid ciphers are components of encipherer 102 of FIG. 1A.

Referring to FIG. 2C, data in the form of plaintext 212 is input into first hybrid cipher 252. In one embodiment, first hybrid cipher 252 encrypts the plaintext 212 using two distinct keys to generate first cipher output 265. First cipher output 265 is input into second hybrid cipher 256 along with two additional distinct keys, which outputs second cipher output 268. Second cipher output 268 is input into a subsequent hybrid cipher along with two additional distinct keys, to produce a cipher output that is input into another hybrid cipher. This process continues, until an (n−1)th cipher output is input into nth hybrid cipher 259 along with two more distinct keys. The nth hybrid cipher 259 may be a third hybrid cipher, a tenth hybrid cipher, a hundredth hybrid cipher, etc.

The nth hybrid cipher 259 generates nth cipher output 275, which is input into block cipher 262 along with a distinct key. The block cipher 262 outputs an (n+1)th cipher output 278. The (n+1)th cipher output 278 may have an alphabet that matches an alphabet of plaintext 212, or a different alphabet. In one embodiment, data encryption process 250 includes enough hybrid ciphers to ensure that every byte in the (n+1)th cipher output 278 depends from every byte of plaintext 212. For example, in the case of block ciphers that operate on 8 byte blocks, processing data with a first block cipher, a double irregular columnar transposition cipher, and a second block cipher, respectively, enables each input byte to affect 64 output bytes. Therefore, if the data is 64 bytes long, then each output byte may depend on each input byte. On the other hand, if the data is 128 bytes long, then each output byte would not depend on each input byte. In another example, if data is processed by a block cipher (BC), double irregular columnar transposition cipher (DICT), BC, DICT, and BC, respectively, and the BCs each operate on 8 byte blocks, then each input byte could affect a maximum of 256 output bytes. In yet another example, if block ciphers that operate on 16 byte blocks are used, processing data by a BC, a DICT, and another BC, respectively, would generate cipher outputs whose output bytes depend on 256 bytes of input data, whereas processing data by a BC, a DICT, a BC, a DICT, and a BC, respectively, would generate cipher outputs whose output bytes depend on 4096 bytes of input data. Though each of the preceding examples has been described using multiple BCs that operate on the same block size, some or all of the BCs may operate on different sized blocks.

FIG. 2D illustrates a data flow 280 corresponding to another embodiment of a data decryption process. The data decryption process is an inverse of the data encryption process illustrates in FIG. 2C. Each of the hybrid ciphers may correspond to hybrid cipher 224 of FIG. 2B. Moreover, each of the hybrid ciphers may be the same, and use the same keys or different keys, or may be different and use different keys. In one embodiment, each of the hybrid ciphers are components of encipherer 102 of FIG. 1A.

Referring to FIG. 2D, encrypted data in the form of (n+1)th cipher output 278 is input into block cipher 262. Block cipher 262 decrypts (n+1)th cipher output 278 employing the same distinct key used by block cipher 278 to generate (n+1)th cipher output 278, thereby reproducing nth cipher output 275. Nth cipher output 275 is input into nth hybrid cipher 259 along with the same two distinct keys used by nth hybrid cipher 259 to generate nth cipher output 275, thereby recreating (n−1)th cipher output 271. (N−1)th cipher output 271 is input into a subsequent hybrid cipher along with two additional distinct keys, to recreate another cipher output that is input into another hybrid cipher. This process continues, until second cipher output 268 is input into second hybrid cipher 256. Second hybrid cipher 256 decrypts second cipher output 268 employing the same distinct keys used to generate second cipher output 268, thereby recreating first cipher output 265. First cipher output 265 is input into first hybrid cipher 252. First hybrid cipher 252 decrypts first cipher output 265 employing the same two distinct keys used by first hybrid cipher 252 to generate first cipher output 265. Thereby, plaintext 212 is recreated.

Figure 3A:
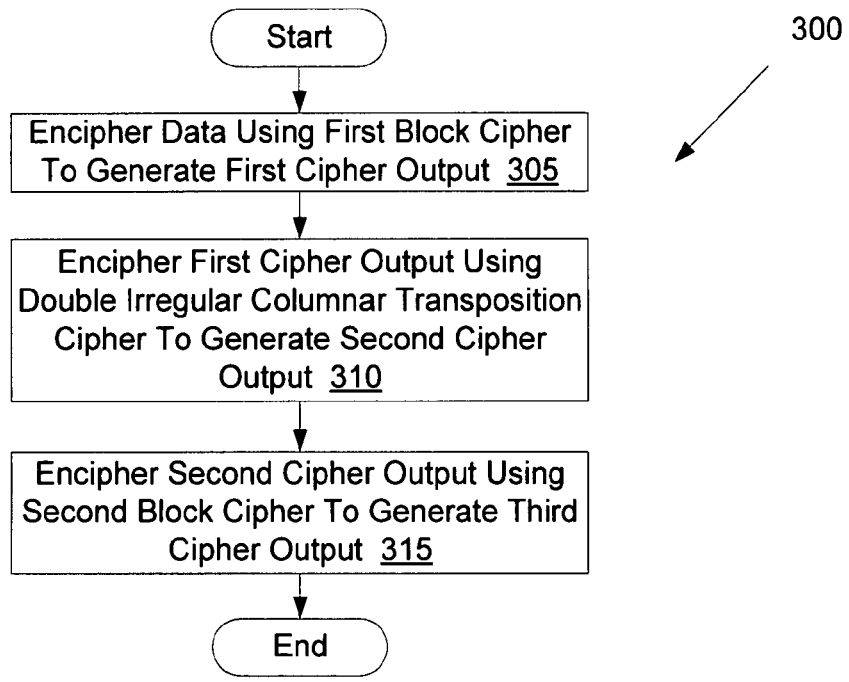
FIG. 3A illustrates a flow diagram of one embodiment for a method of encrypting data.

FIG. 3A illustrates a flow diagram of one embodiment for a method 300 of encrypting data. The method may be performed by processing logic that may comprise hardware (e.g., circuitry, dedicated logic, programmable logic, microcode, etc.), software (such as instructions run on a processing device), or a combination thereof. In one embodiment, method 300 is performed by encipherer 102 of FIG. 1A.

Referring to FIG. 3A, method 300 begins with enciphering data using a first block cipher to generate a first cipher output (block 305). At block 310, the first cipher output is enciphered using a double irregular columnar transposition cipher to generate a second cipher output. At block 315, the second cipher output is enciphered using a second block cipher to generate a third cipher output. Second block cipher may match first block cipher, and may use a function for encryption that is an inverse to a function first block cipher uses to encrypt data. Thereby, an alphabet of third cipher output may match an alphabet of data.

Figure 3B:
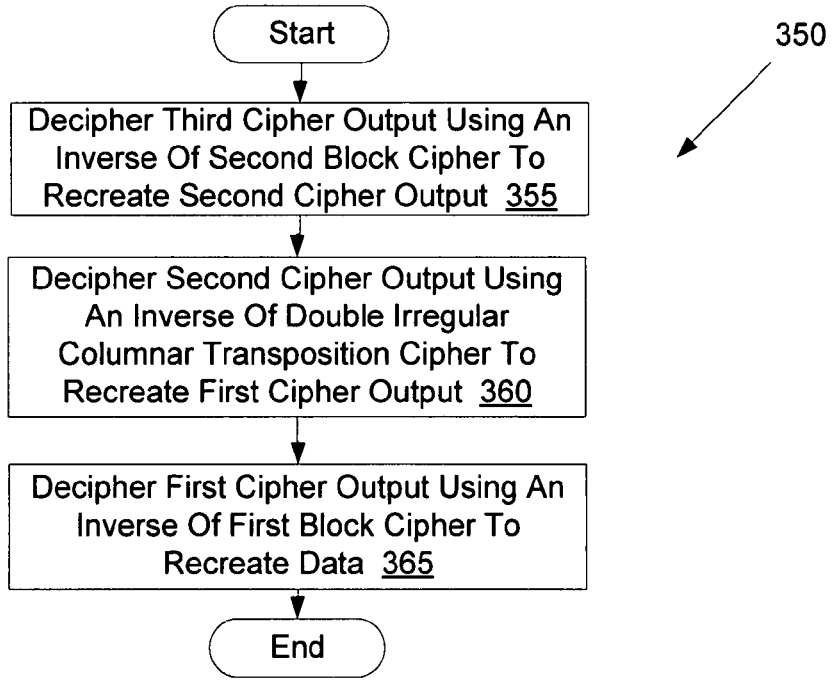
FIG. 3B illustrates a flow diagram of one embodiment for a method of decrypting data.

FIG. 3B illustrates a flow diagram of one embodiment for a method 350 of decrypting data. The method may be performed by processing logic that may comprise hardware (e.g., circuitry, dedicated logic, programmable logic, microcode, etc.), software (such as instructions run on a processing device), or a combination thereof. In one embodiment, method 350 is performed by encipherer 102 of FIG. 1A.

Referring to FIG. 3B, method 350 begins with deciphering a third cipher output using a second block cipher to recreate second cipher output (block 355). At block 360, the second cipher output is deciphered using a double irregular columnar transposition cipher to recreate a first cipher output. At block 365, the first cipher output is deciphered using a first block cipher to recreate data.

Each of the deciphering procedures performed by first block cipher, double irregular columnar transposition cipher and second block cipher uses a function that is an inverse of a function used by these ciphers to encrypt data. To properly decrypt a cipher output, a key that was employed to generate the cipher output must be employed during decrypting.

Figure 4:
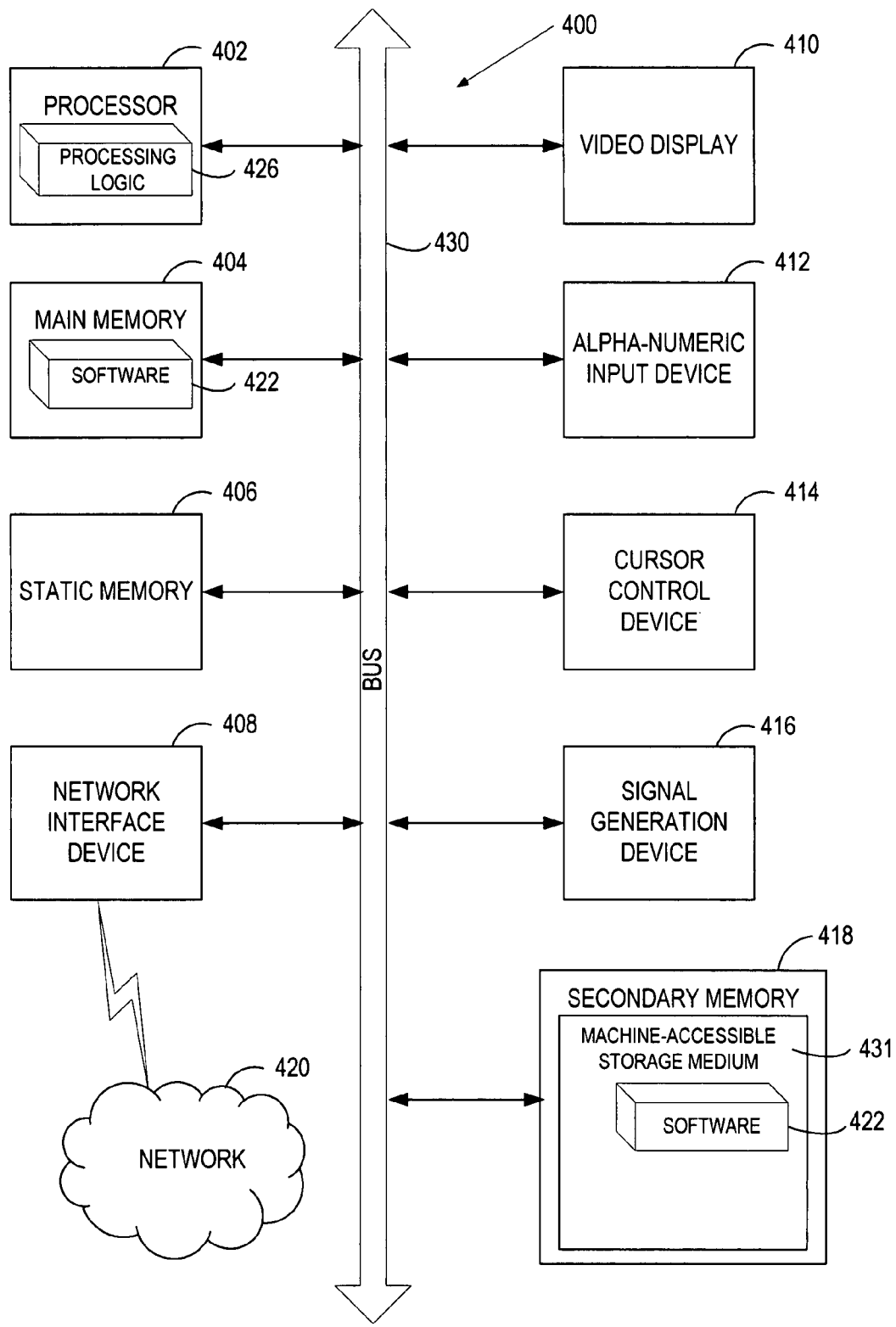
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user preferences that define user profiles. Data structure sets and user profiles may also be stored in other sections of computer system 400, such as static memory 406.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of securing data, comprising:
encrypting data using a first block cipher to generate a first cipher output, wherein the first block cipher receives an input block of size M bits and produces an output block of size N bits and wherein the first block cipher has an input alphabet of X number of symbols and an output alphabet of Y number of symbols;
encrypting the first cipher output using a first double irregular columnar transposition cipher to generate a second cipher output; and
encrypting the second cipher output using a second block cipher to generate a third cipher output.

2. The method of claim 1, wherein the second block cipher matches the first block cipher and uses a function that is an inverse to a function that the first block cipher uses to encrypt data.

3. The method of claim 1, further comprising:
encrypting the third cipher output using a subsequent double irregular columnar transposition cipher and a subsequent block cipher, respectively, in a cascading manner to generate a subsequent cipher output.

4. The method of claim 3, further comprising:
repeating, in a cascading manner, encryption of the subsequent cipher output using the subsequent double irregular columnar transposition cipher and the subsequent block cipher, respectively, to generate a final cipher output having a plurality of output bytes, wherein each of the plurality of output bytes depends from every byte of a plurality of input bytes included in the data.

5. The method of claim 1, wherein the data is encrypted by a first computing device, and the first cipher output and second cipher output are encrypted by a second computing device.

6. The method of claim 5, further comprising:
decrypting the third cipher output using the second block cipher to recreate the second cipher output by a third computing device;
decrypting the second cipher output using the first double irregular columnar transposition cipher to recreate the first cipher output by the third computing device; and
decrypting the first cipher output using the first block cipher to recreate the data by a fourth computing device.

7. The method of claim 1, wherein the input alphabet for the first block cipher is the same as an output alphabet for the second block cipher.

8. The method of claim 1, further comprising:
encrypting the third cipher output using one of the first double irregular columnar transposition cipher and a second double irregular columnar transposition cipher to generate a fourth cipher output; and
encrypting the fourth cipher output using at least one of the first block cipher, the second block cipher, and a third block cipher to generate a fifth cipher output.

9. A non-transitory machine-accessible medium including instructions that, when executed by a machine, cause the machine to perform a method of securing data, comprising:
encrypting data using a first block cipher to generate a first cipher output, wherein the first block cipher receives an input block of size M bits and produces an output block of size N bits and wherein the first block cipher has an input alphabet of X number of symbols and an output alphabet of Y number of symbols;

encrypting the first cipher output using a first double irregular columnar transposition cipher to generate a second cipher output; and encrypting the second cipher output using a second block cipher to generate a third cipher output.

10. The non-transitory machine-accessible medium of claim 9, wherein the second block cipher matches the first block cipher and uses a function that is an inverse to a function that the first block cipher uses to encrypt data.

11. The non-transitory machine-accessible medium of claim 9, the method further comprising:

encrypting the third cipher output using a subsequent double irregular columnar transposition cipher and a subsequent block cipher, respectively, in a cascading manner to generate a subsequent cipher output.

12. The non-transitory machine-accessible medium of claim 11, the method further comprising:

repeating, in a cascading manner, encryption of the subsequent cipher output using the subsequent double irregular columnar transposition cipher and the subsequent block cipher, respectively, to generate a final cipher output having a plurality of output bytes, wherein each of the plurality of output bytes depends from every byte of a plurality of input bytes included in the data.

13. The non-transitory machine-accessible medium of claim 9, wherein the data is encrypted by a first computing device, and the first cipher output and second cipher output are encrypted by a second computing device.

14. The non-transitory machine-accessible medium of claim 13, the method further comprising:

decrypting the third cipher output using the second block cipher to recreate the second cipher output by a third computing device;

decrypting the second cipher output using the first double irregular columnar transposition cipher to recreate the first cipher output by the third computing device; and decrypting the first cipher output using the first block cipher to recreate the data by a fourth computing device.

15. The non-transitory machine-accessible medium of claim 9, wherein the input alphabet for the first block cipher is the same as an output alphabet for the second block cipher.

16. An encryption system, comprising:

a first computing device having a first memory to store instructions for a first block cipher and a first processing device to execute the instructions, wherein the instructions for the first block cipher cause the processing device to encrypt data to generate a first cipher output, wherein the first block cipher receives an input block of size M bits and produces an output block of size N bits and wherein the first block cipher has an input alphabet of X number of symbols and an output alphabet of Y number of symbols;

at least one of the first computing device or a second computing device, having a second memory and a second processing device, to store and execute instructions for a first double irregular columnar transposition cipher, wherein the instructions for the first double irregular columnar transposition cipher cause an executing processing device to encrypt the first cipher output to generate a second cipher output; and at least one of the first computing device or the second computing device to store and execute instructions for a second block cipher, wherein the instructions for the second block cipher cause an executing processing device to encrypt the second cipher output to generate a third cipher output.

17. The encryption system of claim 16, wherein the second block cipher matches the first block cipher and uses a function that is an inverse to a function that the first block cipher uses to encrypt data.

18. The encryption system of claim 16, further comprising:

at least one of the first computing device or the second computing device to store and execute instructions for a subsequent double irregular columnar transposition cipher and a subsequent block cipher, wherein the instructions for the subsequent double irregular columnar transposition cipher and the subsequent block cause an executing processing device to encrypt the third cipher output, respectively, in a cascading manner to generate a subsequent cipher output.

19. The encryption system of claim 18, wherein the subsequent double irregular columnar transposition cipher and the subsequent block cipher to repeatedly, respectively, and in a cascading manner, encrypt the subsequent cipher output to generate a final cipher output having a plurality of output bytes, wherein each of the plurality of output bytes depends from every byte of a plurality of input bytes included in the data.

20. The encryption system of claim 16, wherein the input alphabet for the first block cipher is the same as an output alphabet for the second block cipher.

* * * * *